US010625189B2

(12) United States Patent
Murata et al.

(10) Patent No.: US 10,625,189 B2
(45) Date of Patent: Apr. 21, 2020

(54) OIL SEPARATOR

(71) Applicant: ROKI CO., LTD., Hamamatsu-shi (JP)

(72) Inventors: Takamasa Murata, Hamamatsu (JP); Taisuke Sato, Hamamatsu (JP); Norikazu Seki, Hamamatsu (JP)

(73) Assignee: Roki Co., Ltd., Hamamatsu-Shi (JP)

( * ) Notice: Subject to any disclaimer, the term of this patent is extended or adjusted under 35 U.S.C. 154(b) by 0 days.

(21) Appl. No.: 15/828,692

(22) Filed: Dec. 1, 2017

(65) Prior Publication Data

US 2018/0161712 A1 Jun. 14, 2018

(30) Foreign Application Priority Data

Dec. 9, 2016 (JP) ................................ 2016-239673

(51) Int. Cl.

*B01D 45/08* (2006.01)
*F01M 13/04* (2006.01)
*B01D 45/06* (2006.01)

(52) U.S. Cl.

CPC ............ *B01D 45/08* (2013.01); *B01D 45/06* (2013.01); *F01M 13/04* (2013.01); *F01M 13/0405* (2013.01); *F01M 2013/0433* (2013.01); *F01M 2013/0438* (2013.01); *F01M 2013/0461* (2013.01)

(58) Field of Classification Search

CPC ........ B01D 45/06; B01D 45/08; F01M 13/04; F01M 13/0405; F01M 2013/0433; F01M 2013/0438; F01M 2013/0461

See application file for complete search history.

(56) References Cited

U.S. PATENT DOCUMENTS

| | | | |
|---|---|---|---|
| 5,479,907 | A | 1/1996 | Walker, Jr. |
| 8,499,750 | B2 | 8/2013 | Koyamaishi et al. |

FOREIGN PATENT DOCUMENTS

| | | | |
|---|---|---|---|
| DE | 10 2011 005 798 | A1 | 1/2012 |
| JP | 2003293725 | A * | 10/2003 |
| JP | 2011-094506 | A1 | 5/2011 |
| WO | 2009/138872 | A1 | 11/2009 |

OTHER PUBLICATIONS

Extended European Search Report (Application No. 17205109.6) dated May 11, 2018.

* cited by examiner

*Primary Examiner* — Lindsay M Low
*Assistant Examiner* — Ruben Picon-Feliciano
(74) *Attorney, Agent, or Firm* — Burr & Brown, PLLC

(57) ABSTRACT

The present invention provides an oil separator that can improve oil separation performance with a simple structure. An oil separator includes a casing that has an inlet and an outlet and the oil separator is configured to separate oil contained in blow-by gas in the casing. The casing includes therein multiple staggered partition walls to form a gas passage through which the blow-by gas flows in a meandering manner in a horizontal direction from the inlet to the outlet, and a filter element that partially closes the gas passage and crosses the partition walls.

4 Claims, 7 Drawing Sheets

10
15
30
30a
UP
12(12a)
30b
31
30c
51
51
50
52
25
25
RIGHT
20c
LEFT
26
26
DOWN
21
20a
20b
20

OIL SEPARATOR

BACKGROUND OF THE INVENTION

Field of the Invention

The present invention relates to an oil separator that separates oil in blow-by gas generated in an internal combustion engine, for example.

Description of the Related Art

There are conventional oil separators that separate oil contained in blow-by gas generated during operation of an automobile engine (see Japanese Patent Laid-Open No. 2011-94506).

Such oil separators include, for example, a so-called labyrinth oil separator and a filter oil separator. In a labyrinth oil separator, as illustrated in FIG. 11, a passage 105 through which blow-by gas 103 meanders in a casing 101 is formed by staggered multiple partition walls 107. The partition walls 107 separate oil contained in the blow-by gas 103.

In a filter oil separator, as illustrated in FIG. 12, a partition wall 115 having multiple through holes 112 is provided inside a casing 111 to partition the inside of the casing 111. A filter 117 is arranged behind the partition wall 115, so that blow-by gas 119 having entered through an inlet is accelerated by the through holes 112 to hit the filter 117. Thus, oil contained in the blow-by gas 119 is separated.

However, in the labyrinth oil separator, oil is entrained by the flow of the blow-by gas 103 inside the passage 105, and therefore only a part of the blow-by gas 103 hits the partition walls 107. This hinders separation of oil, and lowers oil separation performance. Hence, to improve oil separation performance, the passage 105 needs to be narrowed by narrowing the gap between the partition walls 107. However, this increases pressure loss, complicates the structure, and lowers formability.

In the filter oil separator, oil separation performance can be improved by the performance of the filter 117. However, if the filter 117 gets clogged, most of the blow-by gas 119 flows without passing through the filter 117. This increases pressure loss, and hinders the oil separator from exerting its original performance.

The present invention has been made in view of the above problems, and aims to provide an oil separator that can improve oil separation performance with a simple structure.

SUMMARY OF THE INVENTION

To solve the above problems, the present invention adopts the following configuration. While reference numerals of the drawings are indicated in brackets for the sake of a better understanding, the invention is not limited to the configuration.

An oil separator (10) includes a casing (15) that has an inlet (11) through which blow-by gas (2) is introduced and an outlet (12) through which the blow-by gas is discharged to an outside, and is configured to separate oil contained in the blow-by gas in the casing. The casing includes therein multiple staggered partition walls (25, 35) to form a gas passage (40), and through which the blow-by gas flows in a meandering manner in a horizontal direction from the inlet to the outlet, and a filter element (50) that partially closes the gas passage, and crosses the partition walls.

The gas passage has multiple adjacent flow paths partitioned by the multiple partition walls, and the filter element crosses all of the flow paths.

The filter element has a single sheet-like member, and its circumference is sandwiched between a base member and a cover member that form the casing.

An aggregate system (60) that gradually narrows a passage leading to the filter element is provided in the gas passage.

An auxiliary flow path (36) that allows the blow-by gas to flow into an adjacent flow path while avoiding the filter element is formed in a part of the partition wall.

The inlet and the outlet are formed separately in the casing to connect with each spaces partitioned by the filter element.

In the oil separator of the present invention, oil is separated by allowing the blow-by gas to pass through the filter multiple times. Hence, oil contained in the blow-by gas can be surely separated. Also, a single sheet-like filter element is arranged creatively, and can therefore be produced easily to improve productivity.

DETAILED DESCRIPTION OF THE PREFERRED EMBODIMENTS

Hereinafter, preferred embodiments of the present invention will be described with reference to the drawings. Note that the following embodiments do not limit the invention according to the claims, and not all of combinations of characteristics described in the embodiments are essential to solving means of the invention.

Embodiment 1

First, an oil separator of Embodiment 1 will be described with reference to FIGS. 1 to 6.

Figure 1:
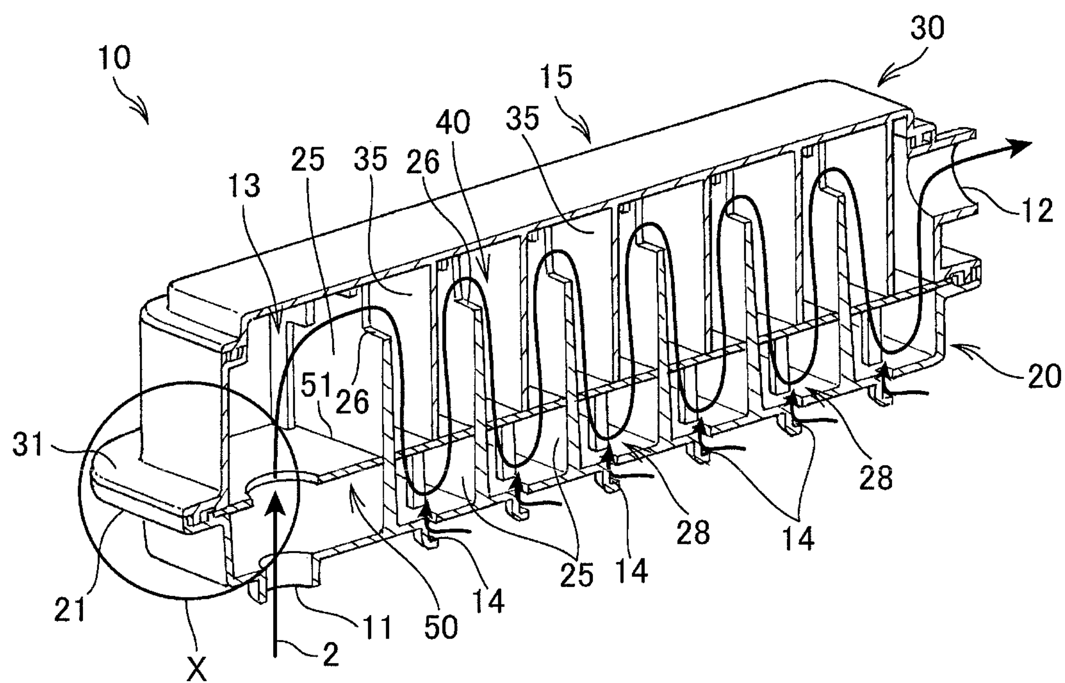
FIG. 1 is a schematic diagram illustrating a configuration of an oil separator of a first embodiment.

As illustrated in FIG. 1, an oil separator 10 of the embodiment 1 separates oil (oil mist) from blow-by gas generated in a crankcase of an automobile engine, and returns the separated oil to the crankcase, for example. Note that although the upper, lower, right, and left directions indicated in FIG. 3 are expressed as the upper, lower, right, and left of the oil separator 10 for convenience in the following description, this does not limit the orientation of the oil separator during use.

The oil separator 10 has a resin casing 15 that has an inlet 11 through which blow-by gas 2 is introduced, and an outlet 12 through which the blow-by gas 2 is discharged to an outside. The casing 15 includes a breather chamber 13 that connects with the inlet 11, and a gas passage 40 that connects the breather chamber 13 and the outlet 12, and allows the blow-by gas 2 introduced into the breather chamber 13 to flow in a meandering manner in a horizontal direction toward the outlet 12. The casing 15 also has a filter element (hereinafter simply referred to as "filter 50.") that partitions the internal space into upper and lower parts and partially closes the gas passage 40.

While the blow-by gas 2 introduced into the breather chamber 13 through the inlet 11 passes through the gas passage 40, oil contained in the blow-by gas 2 is separated by an inner wall of the gas passage 40 and the filter 50. The blow-by gas 2 is then discharged from the outlet 12.

Figure 2:
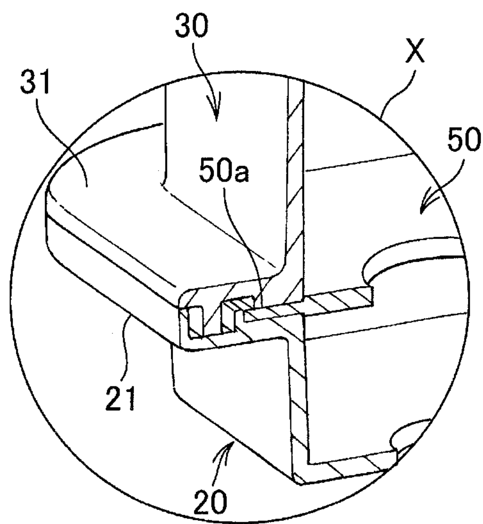
FIG. 2 is an enlarged view of part X of FIG. 1.
Figure 3:
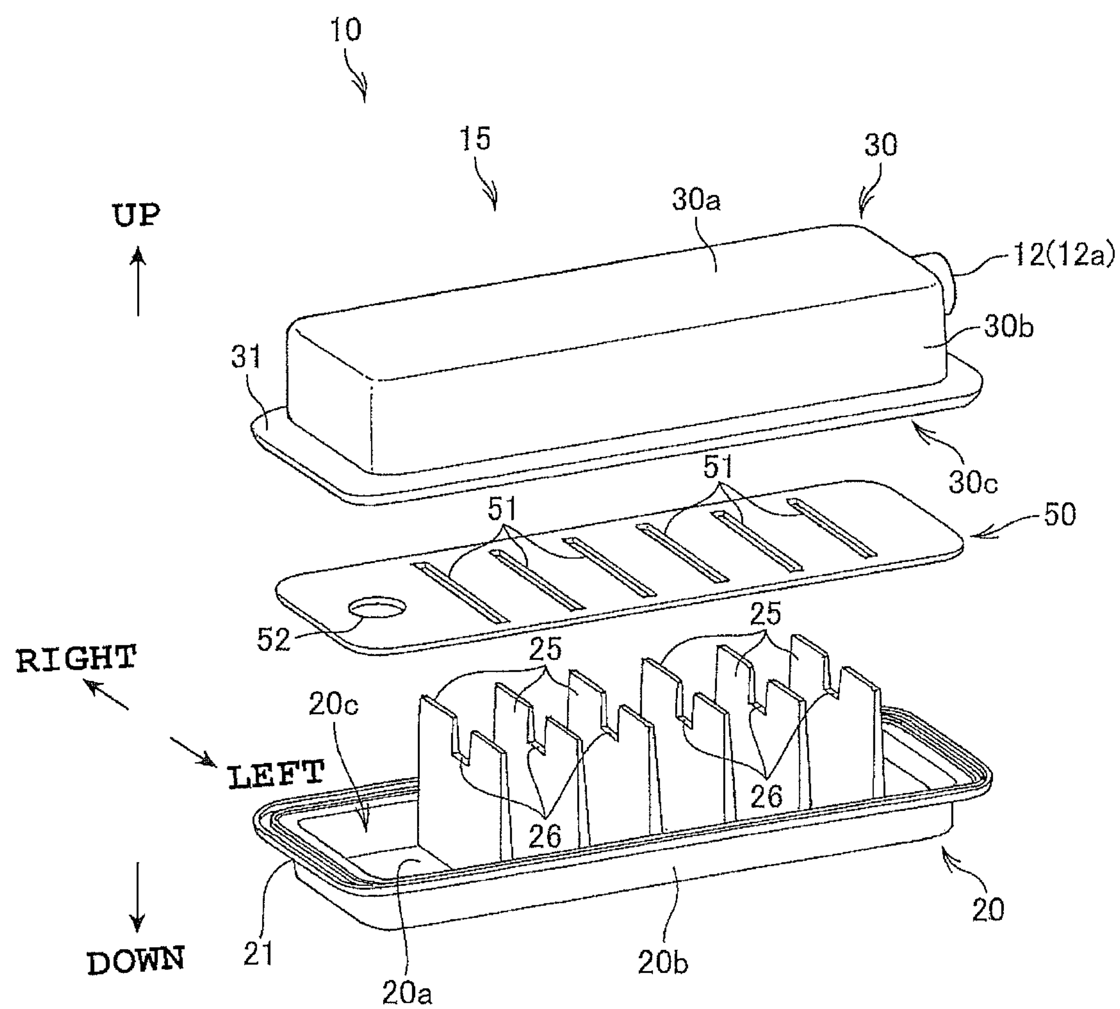
FIG. 3 is an exploded perspective view for describing the configuration of the oil separator of the first embodiment.

As illustrated in FIGS. 1 to 3, the casing 15 includes a base member 20, and a cover member 30 that covers an upper part of the base member 20. The base member 20 and the cover member 30 respectively have flanges 21, 31, and the casing 15 is formed by joining the base member 20 and the cover member 30 by welding together the flanges 21, 31.

As illustrated in FIG. 2, the filter 50 arranged inside the casing 15 is attached by sandwiching an edge 50*a* by the flanges 21, 31 of the base member 20 and the cover member 30.

Figure 4:
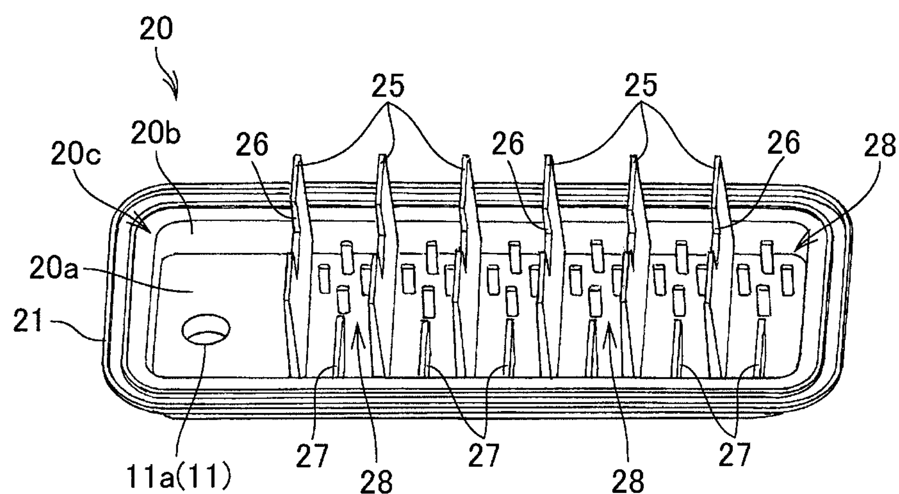
FIG. 4 is a schematic diagram illustrating an external view of a base member.

As illustrated in FIGS. 3 and 4, the base member 20 has a substantially rectangular bottom end wall 20*a*, and four side walls 20*b* extending substantially vertically upward from a circumference of the bottom end wall 20*a*. The base member 20 is formed into a rectangular tube shape having an opening 20*c* in an upper part thereof, and has a flange 21 where tip ends of the side walls 20*b* protrude outward to form a flange shape.

A through hole 11*a* that functions as the inlet 11 is formed in a front part of the bottom end wall 20*a*. Multiple first partition walls 25 vertically arranged upward are provided parallel to one another at predetermined spacings, along a longitudinal direction behind the through hole 11*a*. A cutout portion 26 that is cut out in a substantially rectangular shape is provided in an upper end center part of the first partition wall 25, and the cutout portion 26 functions as a part of the gas passage 40.

Substantially rectangular ribs 27 vertically arranged upward are provided in the bottom end wall 20*a*, and the rectangular ribs 27 and the first partition walls 25 are arranged alternately. The rectangular rib 27 is provided such that a part thereof in the width direction of the bottom end wall 20*a* is open. In this open part, multiple cylindrical cylinder ribs 28 are provided at predetermined spacings to allow passage of the blow-by gas 2. The spacings function as a part of the gas passage 40.

The rectangular rib 27 and the cylindrical rib 28 are set at a same height as the side wall 20*b*, and the rectangular rib 27 and the cylindrical rib 28 partially support the filter 50 from below.

Figure 5:
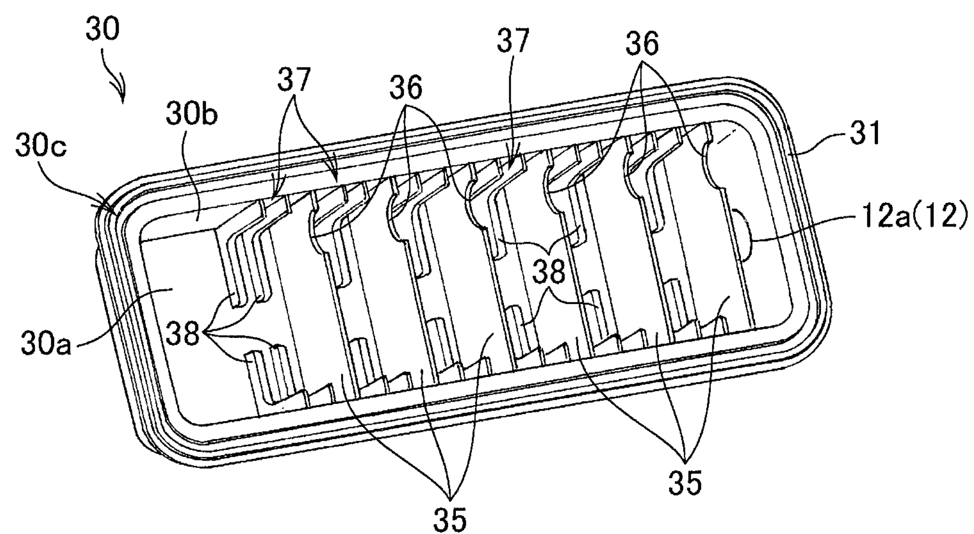
FIG. 5 is a schematic diagram illustrating an external view of a cover member as viewed from a bottom face side.

As illustrated in FIGS. 3 and 5, the cover member 30 has a substantially rectangular upper end wall 30*a*, and four side walls 30*b* extending substantially vertically downward from a circumference of the upper end wall 30*a*. The cover member 30 is formed into a rectangular tube shape having an opening 30*c* in a lower part thereof, and has a flange 31 where tip ends of the side walls 30*b* protrude outward to form a flange shape.

A through hole 12*a* that functions as the outlet 12 is formed in the rear side wall 30*b* of the cover member 30, and the blow-by gas 2 from which oil is separated is discharged from the through hole 12*a*.

Figure 6:
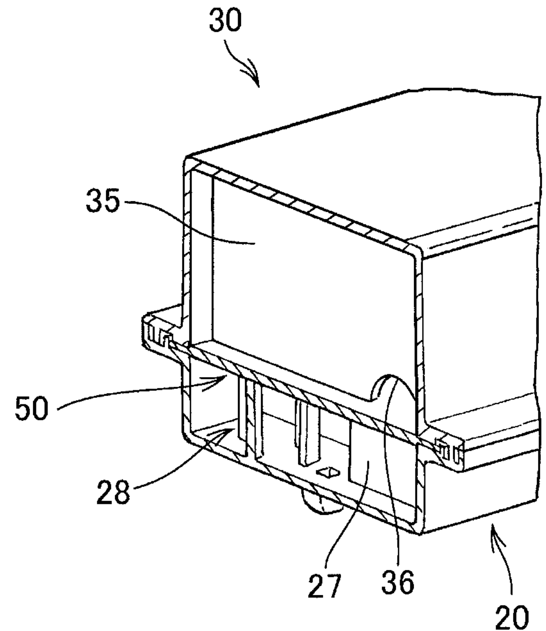
FIG. 6 is a schematic diagram illustrating an exemplar arrangement of a second partition wall.

A space that forms the breather chamber 13 is formed in a front part of the upper end wall 30*a*. Multiple second partition walls 35 vertically arranged downward are provided parallel to one another at predetermined spacings, along a longitudinal direction behind the space. As illustrated in FIGS. 5 and 6, a cutout portion 36 that is cut out in a substantially semicircular shape is provided in a lower end part of the second partition wall 35, and the cutout portion 36 functions as an auxiliary flow path of the blow-by gas 2 in case the filter 50 gets clogged.

Engaging bodies 37 that engage with tip ends of the first partition walls 25 are provided in the upper end wall 30*a*, and the engaging bodies 37 and the second partition walls 35 are arranged alternately. The engaging body 37 has a pair of substantially L-shaped protrusions 38 arranged at the front and rear of an outer edge of the first partition wall 25 to hold the outer edge thereof. The protrusions 38 protrude inward from the upper end wall 30*a* and the side wall 30*b*.

As illustrated in FIG. 1, when the cover member 30 is attached to the base member 20 in the oil separator 10 of the embodiment, the first partition wall 25 and the second partition wall 35 are arranged alternately in a substantially staggered manner. As illustrated in FIG. 1, the first and second partition walls 25, 35 form the gas passage 40 through which the blow-by gas 2 flows in a vertically meandering manner from the inlet 11 to the outlet 12. As illustrated in FIG. 6, the rectangular rib 27 is provided in the same straight line as the extending direction of the second partition wall 35. The filter 50 is sandwiched between the rectangular rib 27 and the second partition wall 35.

As illustrated in FIG. 3, the filter 50 is a substantially rectangular sheet-like member that has about a same size and shape as the opening 20*c* of the base member 20, for example. The filter 50 includes multiple slits 51 that allow passage of the first partition walls 25 and are provided parallel to one another at predetermined spacings in a length direction thereof. A circular through hole 52 for connecting with the breather chamber 13 is formed in a part of the filter 50 that faces the inlet 11.

As illustrated in FIG. 1, the filter 50 can be positioned with respect to the base member 20 by inserting the first partition walls 25 into the slits 51. The oil separator 10 is formed by positioning the filter 50 with respect to the base member 20, sandwiching the circumference of the filter 50 by the flanges 21, 31 of the base member 20 and the cover member 30, and welding together the flanges 21, 31.

Next, a configuration of the gas passage 40 formed inside the oil separator 10 will be described in detail with reference to FIG. 1.

The gas passage 40 is formed of the first partition walls and the second partition walls 35 that are staggered to prevent the blow-by gas 2 introduced through the inlet 11 from flowing straight forward to the outlet 12. The blow-by gas 2 flows in a vertically meandering manner from the inlet 11 to the outlet 12.

The gas passage 40 has multiple adjacent flow paths partitioned by the first and second partition walls 25, 35. Each flow path is connected to another flow path by a spacing formed by the cutout portion 26 and the cylindrical rib 28, so that the gas passage 40 reciprocates multiple times.

The gas passage 40 is partially closed by the filter 50, which crosses the first partition walls 25 and crosses all of the flow paths forming the gas passage 40.

Accordingly, the blow-by gas 2 introduced through the inlet 11 is guided to the outlet 12 in a meandering manner. While the blow-by gas 2 passes through the gas passage 40, oil contained in the blow-by gas 2 is separated by hitting the first or second partition wall 25, 35, or passing through the filter 50. The blow-by gas 2 is then discharged from the outlet 12.

The filter 50 shields each multiple passage forming the gas passage 40 in such a manner as to partition them into upper and lower parts. Hence, the blow-by gas 2 passes through the filter 50 multiple times when passing through the gas passage 40, whereby oil contained in the blow-by gas 2 can be surely separated.

The filter 50 allows insertion of the first partition walls 25 through the slits 51, is a sheet-like member that crosses the first partition walls 25, and is attached by sandwiching the edge 50*a* of the filter 50 by the flanges 21, 31 of the base member 20 and the cover member 30. Hence, the filter 50 can be manufactured easily, and productivity can be improved. Since different parts of the single filter 50 are inserted in respective passages forming the gas passage 40, an effective area of the filter 50 can be efficiently maximized and utilized. This can improve oil separation performance easily.

The cutout portion 36 formed in the second partition wall allows connection between adjacent flow paths while avoiding the filter 50. If the filter 50 gets clogged by oil, for example, the blow-by gas 2 is allowed to pass through the gas passage 40 without passing through the filter 50, by using the cutout portion 36. Hence, complete blockage of the gas passage 40 can be prevented.

In the oil separator 10 of the embodiment, the inlet 11 and the outlet 12 are separately provided in the base member 20 and the cover member 30, and the filter 50 partitions space between the base member 20 and the cover member 30. Hence, it is possible to make the blow-by gas 2 surely pass through the filter 50.

Although it is not an essential configuration, as illustrated in FIG. 1, other outlets 14 that return the oil separated while passing through the gas passage 40 to a crankcase are provided in the bottom end wall 20*a* of the base member 20 so as to connect with the space surrounded by the filter 50 and the first partition walls 25. Note that the outlets 14 do not necessarily have to be connected to all of the lower spaces separated by the filter 50. As indicated by an arrow in FIG. 1, the blow-by gas 2 may flow in through the outlet 14. In this case, the blow-by gas 2 also surely passes through the filter 50 to be discharged from the outlet 12.

Embodiment 2

Next, Embodiment 2 of the oil separator will be described with reference to FIGS. 7 to 10. Note that in FIGS. 7 to 10, parts common to FIGS. 1 to 6 are assigned the same reference numerals, and detailed descriptions thereof will be omitted.

This embodiment is different from Embodiment 1 in that it includes an aggregate system 60 that narrows a flow path before contacting a filter 50.

Figure 7:
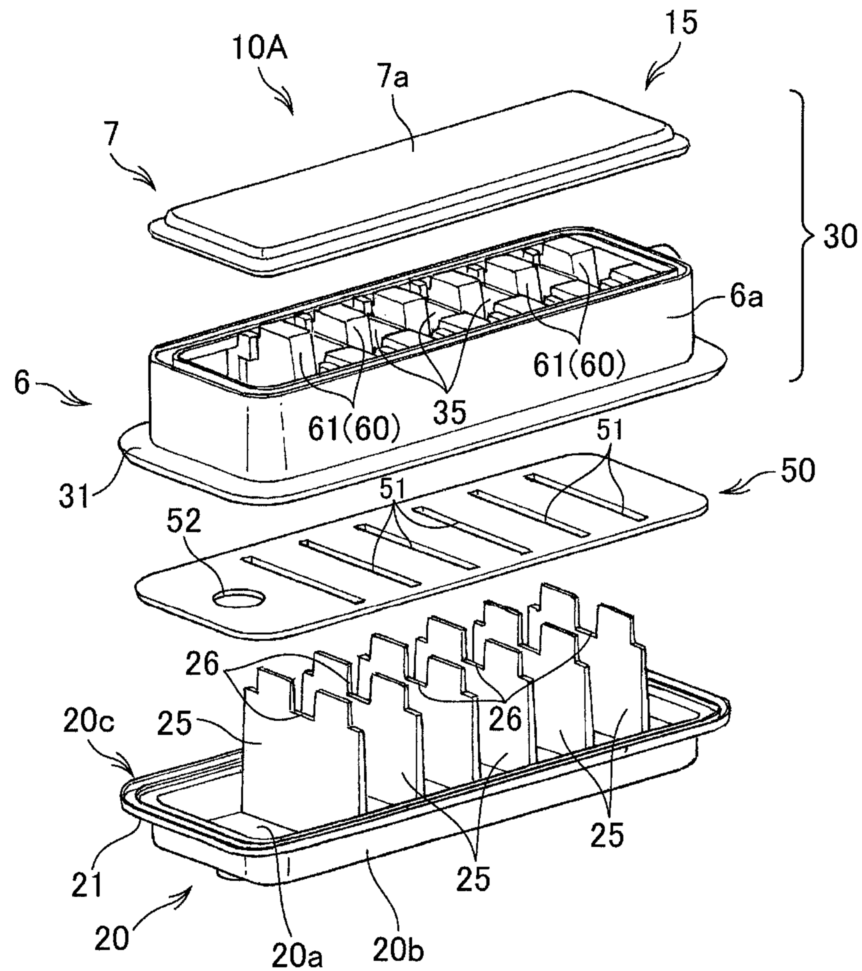
FIG. 7 is an exploded perspective view for describing a configuration of an oil separator of a second embodiment.

As illustrated in FIG. 7, an oil separator 10A of the embodiment has a casing 15. The casing 15 includes a base member 20, and a cover member 30 that covers an upper part of the base member 20, for example. The casing 15 also has the filter 50 therein that partitions an internal space into upper and lower parts and partially closes a gas passage 40.

The cover member 30 is divided into a port member 6 and a port cover member 7 placed on the port member 6.

Figure 8:
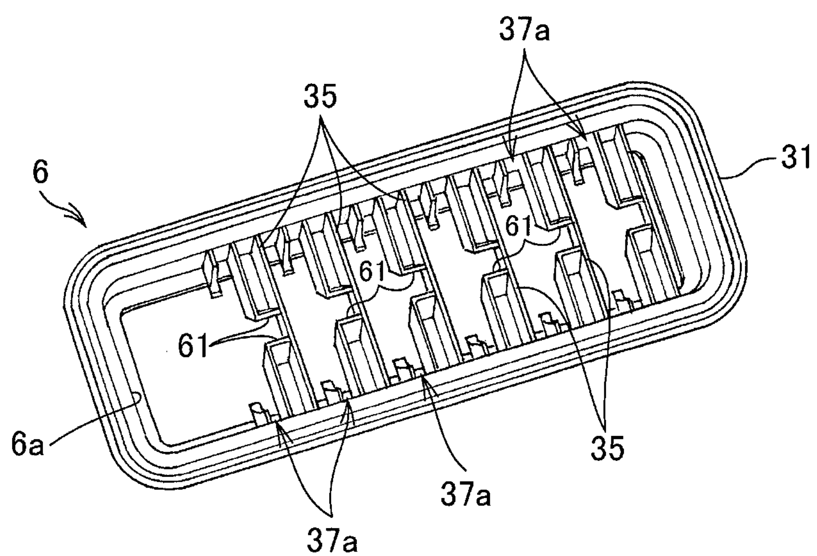
FIG. 8 is a schematic diagram illustrating an external view of a port member.
Figure 9:
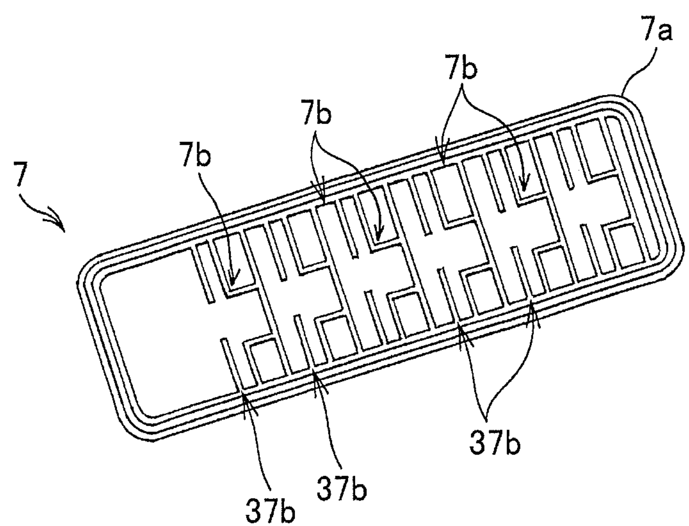
FIG. 9 is a schematic diagram illustrating an external view of a port cover member as viewed from a bottom surface side.

As illustrated in FIGS. 7 and 8, the port member 6 has, in addition to second partition walls 35, the aggregate system 60 that gradually narrows the gas passage 40 formed together with first partition walls 25.

Figure 10:
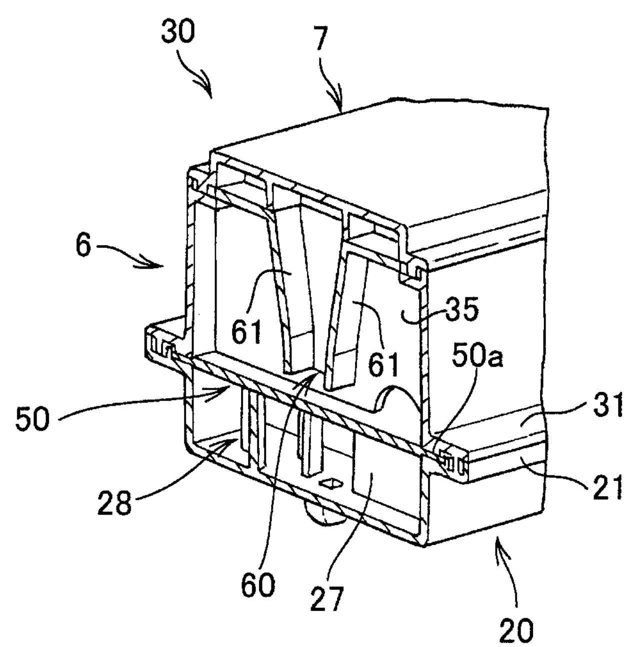
FIG. 10 is a partial cross-sectional view illustrating an example of an aggregate system.
Figure 11:
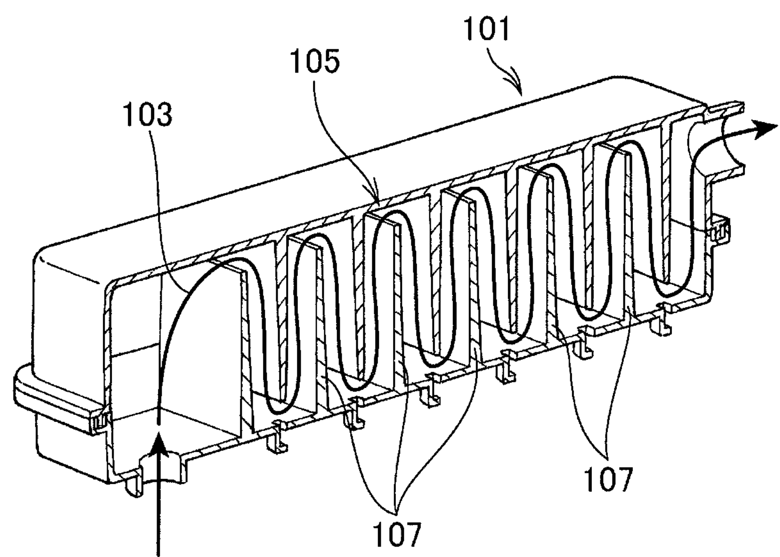
FIG. 11 is a schematic diagram illustrating an example of a conventional oil separator.
Figure 12:
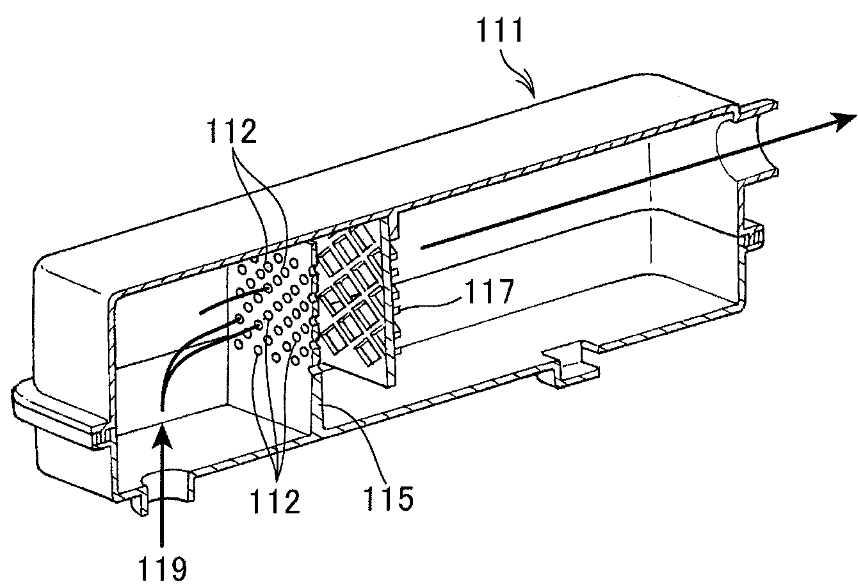
FIG. 12 is a schematic diagram illustrating another example of a conventional oil separator.

As illustrated in FIG. 10, the aggregate system 60 includes aggregate members 61 that protrude from the front of the second partition walls 35, and the aggregate members 61 gradually narrow the flow path before contacting the filter 50. Note that although the aggregate member 61 is formed of multiple members, the form is not limited to the embodiment.

A lower end of the aggregate member 61 is designed to leave a predetermined spacing between itself and a surface of the filter 50. A flow path formed by the aggregate member 61 can increase the flow rate of blow-by gas 2 flowing therethrough, and can thereby improve oil separation performance. Since the aggregate member 61 leaves a spacing between itself and the filter 50, the blow-by gas 2 is allowed to pass through the filter 50 from surrounding areas other than an area that faces the flow path. This can prevent clogging of the filter 50, and maximize an effective area of the filter 50 to use the filter 50 efficiently.

As illustrated in FIGS. 7 and 8, the port member 6 has a rectangular tube shaped main body 6*a*, and a lower end part of the main body 6*a* is formed into a flange 31 that protrudes outward to form a flange shape.

The port cover member 7 has a substantially rectangular end wall 7*a*, and the end wall 7*a* is attached to the port member 6 to close an upper opening of the port member 6.

The port cover member 7 has, on an inner side of a lower end part thereof, flow path-forming ribs 7*b* for forming flow paths with the aggregate members 61 that form the aggregate system 60 in the port member 6, when attached to the port member 6. The flow path-forming ribs 7*b* are formed into predetermined shapes by multiple members vertically arranged downward from the end wall 7*a*.

Engaging bodies 37*a* that engage with both side ends of the first partition walls 25 are provided in the port member 6, and the engaging bodies 37*a* and the second partition walls 35 are arranged alternately. Engaging bodies 37*b* that engage with tip ends of the first partition walls 25 are provided in the port cover member 7, and the engaging bodies 37*b* and the flow path-forming ribs 7*b* are arranged alternately. Note that in Embodiment 2, the flow path-forming ribs 7*b* partially function as a part of the engaging bodies 37*b*.

The oil separator 10A of the embodiment includes the aggregate system 60, and separates oil contained in the blow-by gas 2 by accelerating the blow-by gas 2 flowing in the gas passage 40 by the aggregate system 60, and allowing it to hit the filter 50. Hence, oil separation performance can be improved easily.

As has been described, the oil separator 10 of the embodiment includes the casing 15 that has an inlet 11 through which the blow-by gas 2 is introduced and the outlet 12 through which the blow-by gas 2 is discharged to an outside, and is configured to separate oil contained in the blow-by gas 2 in the casing 15. The casing 15 includes therein multiple staggered partition walls 25, 35 to form the gas passage 40, through which the blow-by gas 2 flows in a meandering manner in a horizontal direction from the inlet

11 to the outlet 12, and the single sheet-like filter 50 that crosses all of flow paths forming the gas passage 40 partially closes the gas passage 40.

Accordingly, oil contained in the blow-by gas 2 is separated by hitting the first or second partition wall 25, 35 or passing through the filter 50 multiple times while passing through the gas passage 40. Hence, the oil contained in the blow-by gas 2 can be surely separated.

The filter 50 is a single sheet-like member that crosses the inside of the casing 15, and is attached by sandwiching its edge 50*a* by the flanges 21, 31 of the base member 20 and the cover member 30 that form the casing 15. Hence, the filter can be manufactured easily, and productivity can be improved.

Note that the embodiments refer to only certain forms, and do not limit the invention. It is clear from the description of the scope of claims that appropriately modified or improved forms may also be included in the technical scope of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2016-239673 filed on Dec. 9, 2016 including the specification, claims, drawings and summary is incorporated herein by reference in its entirety.

REFERENCE SIGNS LIST

10, 10A oil separator
11 inlet
12 outlet
15 casing
20 base member
21, 31 flange
25 first partition wall
30 cover member
35 second partition wall
40 gas passage
50 filter
50*a* edge
51 slit
60 aggregate system

What is claimed is:

1. An oil separator, the oil separator comprising a casing that has an inlet through which blow-by gas is introduced and an outlet through which the blow-by gas is discharged to an outside, and configured to separate oil contained in the blow-by gas in the casing, wherein the casing comprises therein a plurality of staggered partition walls to form a gas passage through which the blow-by gas flows in a meandering manner in a horizontal direction from the inlet to the outlet, and a filter element that partially closes the gas passage, and crosses the partition walls, the filter element is a single sheet-like member that is configured to pass the blow-by gas therethrough, and has a circumference that is sandwiched between a base member and a cover member that form the casing, the filter element including multiple slits, that allow passage of the partition walls, and are provided parallel to one another at predetermined spacings in a length direction thereof, wherein the gas passage has a plurality of adjacent flow paths partitioned by the plurality of partition walls such that the filter element crosses all of the flow paths and the blow-by gas passes through the filter element multiple times when passing through the gas passage.

2. The oil separator according to claim 1, wherein an aggregate system that gradually narrows a passage leading to the filter element is provided in the gas passage.

3. The oil separator according to claim 1, wherein an auxiliary flow path that allows the blow-by gas to flow into an adjacent flow path while avoiding the filter element is formed in a part of the partition wall.

4. The oil separator according to claim 1, wherein the inlet and the outlet are formed separately in the casing to connect with each space partitioned by the filter element.

* * * * *